United States Patent [19]
Krasnow

[11] 4,059,525
[45] Nov. 22, 1977

[54] SLIDE FILTERS

[76] Inventor: Leonard L. Krasnow, 293 Turnpike Road, Westboro, Mass. 01581

[21] Appl. No.: 700,100

[22] Filed: June 28, 1976

[51] Int. Cl.$^2$ .............................................. B01D 25/12
[52] U.S. Cl. ................................. 210/236; 210/329; 210/350; 210/359; 210/445; 210/447; 210/DIG. 15
[58] Field of Search ............... 210/184, 236, 232, 447, 210/239, 238, DIG. 15, 350, 460, 463, 329, 446, 359, 445; 241/83, 84, 89.1, 87, 89.2

[56] References Cited
U.S. PATENT DOCUMENTS

| | | | |
|---|---|---|---|
| 2,786,504 | 3/1957 | Samler | 210/236 |
| 3,471,017 | 10/1969 | Kalman | 210/184 |
| 3,653,419 | 4/1972 | Schutter | 210/236 |
| 3,675,934 | 7/1972 | Heston | 210/447 |
| 3,743,101 | 7/1973 | Schmidt | 210/447 |
| 3,797,665 | 3/1974 | Paquette | 210/236 |
| 3,804,758 | 4/1974 | Cooper et al. | 210/236 |
| 3,856,680 | 12/1974 | Elmore | 210/184 |
| 3,876,545 | 4/1975 | Norwood | 210/236 |
| 3,962,092 | 6/1976 | Newman | 210/236 |
| 3,983,038 | 9/1976 | Heston | 210/447 |

Primary Examiner—Frank W. Lutter
Assistant Examiner—Frank Sever
Attorney, Agent, or Firm—Alfred H. Rosen; Frank A. Steinhilper

[57] ABSTRACT

A slide filter for filtering plastic stock and other materials having a slide plate movable within a housing, across the path of material flow. The housing contains sealing means to prevent leakage of the material to the outside of the housing. The slide plate includes one or more recesses bounded by wall means within which a mechanical screen or sand pack filter is positioned.

18 Claims, 11 Drawing Figures

SLIDE FILTERS

BACKGROUND OF THE INVENTION

In the manufacture of articles from rubbery, visco-elastic and plastic working materials, sometimes called plastic stock, it is common practice to filter the working materials. This may be done, for example, in a reclaiming process, to prepare re-claimed materials for use in a product; it may also be done, for example, in an extrusion apparatus, to make certain that no foreign matter will be introduced into an extrusion die.

An extrusion process is a continuous process in which the quality and quantity of the extrudate is proportional to the stability and consistency of the melt. A change in operating conditions changes the quality or quantity or both of the end product. The practice of filtering in an extrusion process results in a change of operating conditions because of the accumulation of contaminants on the filter. When the filter is clean a 1500 psi pressure drop might appear at the start of the process thus establishing a given quality and rate. As time goes on and the screen collects contaminants from the melt, the pressure drop increases, the rate of production decreases, the melt temperature increases, and thus the quality of the product is changed. When the pressure drop reaches 4,000 psi, for example, and the dirty filter is changed for a clean one, the pressure is reduced back to 1500 psi instantaneously. This causes a severe transient to the process requiring stabilization time and operator attention. During this stabilization time inferior product may be produced.

To minimize these changes in operation slide plate filters have been utilized. One of the earliest slide plate filters is shown in U.S. Pat. No. 42,814 issued to Cowen in 1900. Slide plate filters according to Cowen are still in use today. Other forms of slide plate filters which like Cowan are intended to be athwart an oncoming stream of plastic stock (the "melt stream") are shown in Garrahan's U.S. Pat. No. 1,195,576; Voight U.S. Pat. No. 3,684,419 and Paquette U.S. Pat. No. 3,797,665. In general, the area of filter surface which is presented across the melt stream is essentially the same as a right cross section of that stream.

It is common practice to use filters of the type described, in apparatus by which the plastic stock is pressurized; in some such apparatus the pressure applied may reach 10,000 pounds per square inch or more. There is, therefore, a need to seal the apparatus against leakage of plastic stock from the melt stream along surfaces of the slide plate. Paquette describes one such sealing mechanism.

GENERAL NATURE OF THE INVENTION

The present invention is a new and improved slide filter device. The slide filter device has a fluid passage through which material under pressure is caused to flow, a slide plate movable across said passage of material flow, inlet and outlet means for guiding the slide plate across the passage of material flow, sealing means effective in the inlet and outlet means, recesses in said slide plate with wall means separating each recess from an adjacent recess, and screening means within each recess for collecting the contaminants in said material.

The recesses may have a rectangular configuration with a quantity cross sectional area approximately equal to, smaller or larger than the cross sectional area of the fluid passage, depending upon the application. The wall means, which may be in the form of bars between said recesses, provide this slide filter device with numerous operating advantages sought after by people skilled in the art. The wall means or bars are configured in relation to the recesses so that at least one bar is in the sealing means in each of the inlet and the outlet means. This arrangement reduces the problems of sealing high pressure flow processes from leakage around the filtering means. The problem of preventing leaks from such devices is a serious problem in the field today.

In addition to providing rigid support to the screens the bars encompassing the recesses allow the user to utilize commercially available screens. Slide plates according to the invention may be designed to be advanced continuously or incrementally across the melt stream. A series of slide plates, one following the other in use, may be employed to provide substantially uninterrupted use of a filter with minimized pressure drop variation. This can have the distinct advantage of reducing the amount of extruder horsepower needed to push the material through the filter. Today, where the cost of energy is becoming increasingly expensive, the resulting savings can be substantial.

The nature of the invention is more completely illustrated in the accompanying drawings in which.

DETAILED DESCRIPTION OF THE INVENTION

Figure 1:
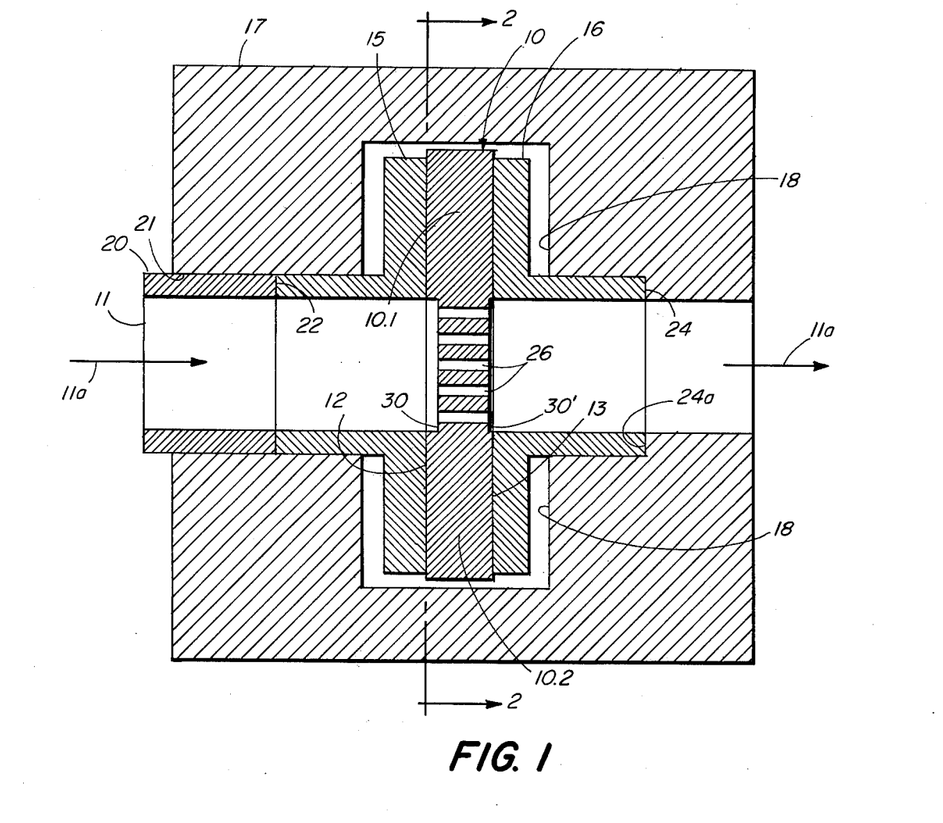
FIG. 1 is a longitudinal sectional view of one embodiment of my invention.

In FIG. 1 is shown a sectional view of slide filter apparatus. Shown are slide plate 10 positioned across the fluid passage 11 with its front surface 12 and rear surface 13. The material (not shown) in fluid passage 11 flows in the direction of the arrows 11a. The fluid passage 11 is typically cylindrically-shaped pipe whose structural strength is chosen according to the specific parameters of material flow including temperature and pressure. Preferably, the cross-section of the interior of the passage 11 may be altered from cylindrical to rectangular where the passage meets the plate 10, without changing the cross-sectional area in the transition region (not shown).

Along the front surface 12 of slide plate 10 and extending circumferentially around the fluid passage 11 is a front surface seal 15. Similarly, along the rear surface 13 of slide plate 10 and extending circumferentially around the fluid passage 11 is a rear surface seal 16.

The slide filter housing 17 is configured to surround the fluid passage 11 and provide support to the slide plate 10 and its associated seals 15 and 16. A slot 18 across the housing 17 provides space for seals 15 and 16 and space for the slide plate 10 to move across the direction of fluid flow. The seals 15 and 16 are substantially similar to the sealing means of the Paquette U.S. Pat. No. 3,797,665, and include as operating means a cylindrical sleeve bearing member 20 provided within cylindrical bore 21 on the upstream side of the material flow. One end 22 of the sleeve abuts the front surface seal 15 in slot 18 so that when the sleeve 20 is caused to move against seal 15 the material in the fluid passage 11 is confined to the passage and prevented from leaking out of the passage. The rear surface seal 16 in slot 18 is situated within cylindrical bore 21 so that its end surface 24 is caused to press against a shoulder 24a in the housing 17 when the sleeve 20 is put under pressure in the direction of fluid flow. This configuration thus provides a sealing means to prevent leakage during the filtering process.

The portion of the slide plate exposed to the flow of material has a recess 30, and within the recess a breaker plate portion with passageways 26 which normally are covered with a filter screen. In the present invention screens, sintered metal or sand packs may be used, as will presently be described.

Figure 2:
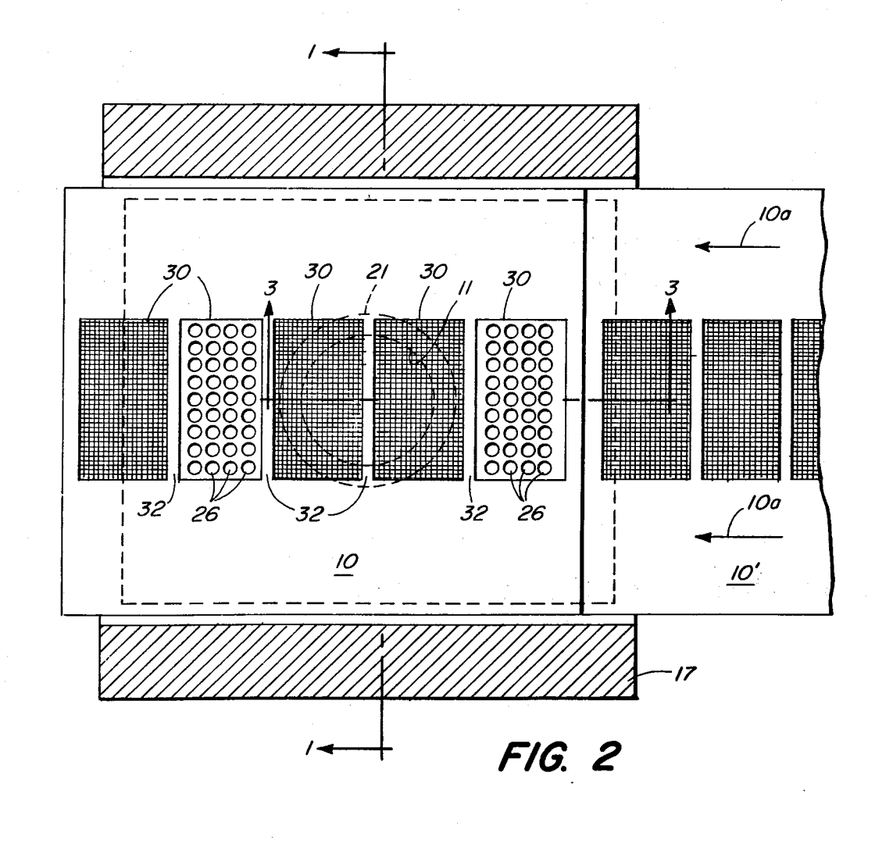
FIG. 2 is a section view along line 2—2 in FIG. 1.

FIG. 2 more clearly shows the slide plate configuration with a series of recesses 30 formed in the plate 10. Behind the recesses are shown in dotted lines, the cylindrical bore 21 and the fluid passage 11. In two of the recesses 30 are shown the breaker plate passageways 26. To simplify the illustration, two recesses 30 are shown schematically with filter screens in place and some are shown with such screens absent, the better to illustrate passageways 26. One can choose screens with any desired filtration characteristics to place in the recesses 30. The recesses will accept screens, sintered fiber filters, sintered metal filters, as well as sand pack filters. Described below and illustrated in FIG. 3A is a recess configuration containing a sand pack filter.

Figure 3:
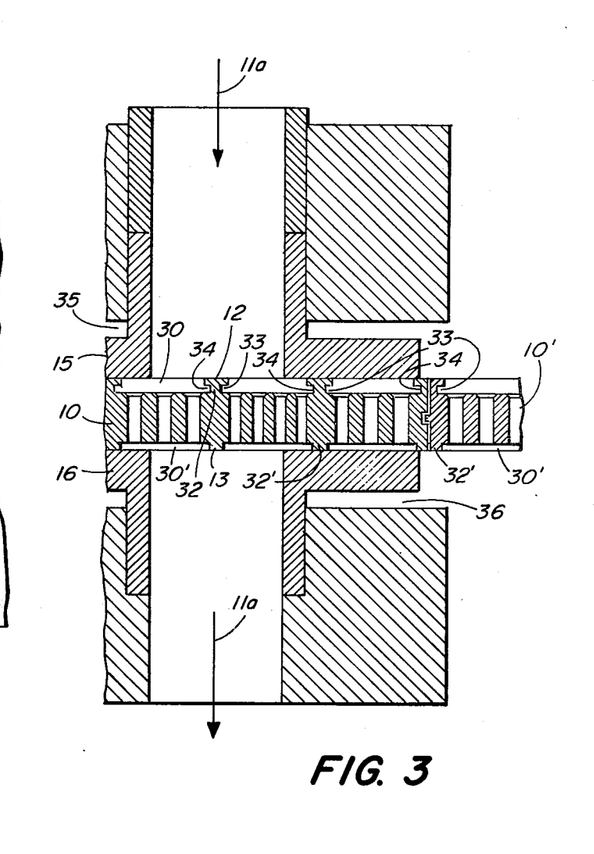
FIG. 3 is a partial section along line 3—3 in FIG. 2.

Between each adjacent two recesses 30 are the wall means or bars 32 separating the recesses and being in width a minor fraction of the width of the recesses. These bars are more clearly shown in FIG. 3 where the front surface 12 and rear surface 13 of the plate 10 are shown. As can be envisioned in FIG. 3, the filtering screens can be placed in each recess so as to fit in grooves 33 and 34 which are, in this illustration, undercuts in the walls 32. As can be appreciated, there are many methods known to those skilled in the art of securing the screens to the slide plate. In this invention the screens do not become clogged with collected materials because the slide plate 10 can be advanced continuously across the path of material flow thus continuously moving clean filter screens into the path of material flow. As FIGS. 2 and 3 show, a second plate 10' can follow the first plate 10, in the direction of arrows 10a, to provide a continuous mode of operation. The continuous mode of operation is such that the slide plate 10 is always in motion without regard to changes in its rate of speed. It will be clear to those skilled in the art that, if desired, the slide plate 10 can be moved incrementally as well.

Figure 3A:
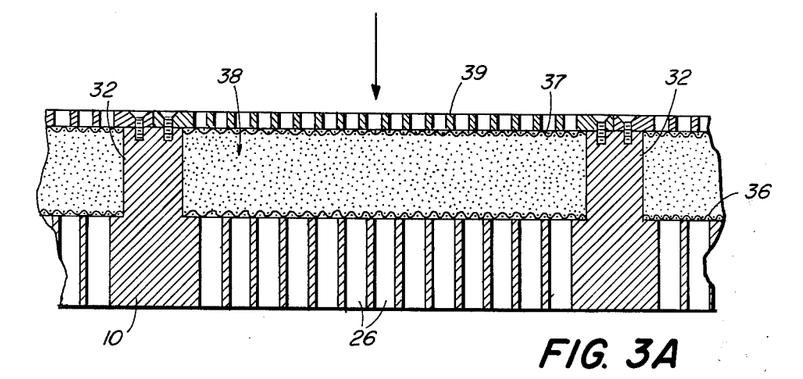
FIG. 3A is an exploded view of a sand pack filter-recess configuration.

FIG. 3A shows a typical sand pack filter-recess configuration. Between the bars 32 bounding a recess and the breaker plate portion of that recess with passageways 26 is shown a lower screen 36, an upper screen 37 with sand 38 located between the screens 36 and 37. Located above upper screen 37 is a perforated retainer plate 39. Retainer plate 39 has sufficiently open perforations, which can be of any desired geometric configuration, to allow the material being filtered to flow through the plate without introducing serious pressure drop problems as described above. The retainer plate 39 can be secured to the bars 32 by any available means known to those skilled in the art. For example, the retainer plate 39 can be bolted directly to the bars 32, or positioned to rest against the inside surface of bars 32 while covering substantially all of screen 37 and held in place by a retainer, slot-ring configuration or the like, (not shown). The fact that sand pack filters are typically deeper than mechanical screen filters requires that the bars 32 be correspondingly deeper in order to provide a deeper recess 30. For example, a typical screen recess from the top of bar 32 to the top of passageways 26 can be in the order of ¼ inch, whereas for sand pack filters the depth of the recess can be in the order of ½ to 1½ inches.

The front surface 12 of the slide plate 10 with its walls or bars 32 separating the recesses is impressed in use against the front surface seal 15, as shown in FIG. 3. This configuration has two significant advantages over the prior art systems. The bars 32 provide retaining means (33, 34) to hold screen means, as well as providing sealing means to prevent leakage of material along the front surface of the slide plate to the exterior of the filtration apparatus through the inlet and outlet passages 35, 36, for the plate 10. The width of each recesses 30 is relative to the length of each sealing means such that at least one bar 32 is at all times in sealing contact with the front surface seal 15 in each of the inlet and outlet passages 35, 36, respectively. The rear surface 13 of the plate has shallow recesses 30' in register with the filter recesses 30, separated from each other by bars 32' that are in register with the front surface walls or bars 32. Recesses 30' are configured to provide venting of air, should any air be present through inadvertence, and also to reduce the amount of friction between the slide plate 10 and the rear surface seal 16. The rear surface bars 32' make corresponding sealing contact with the rear surface seal 16 and thus provide a high degree of rigid sealing in the inlet and outlet passages. As can be seen in FIG. 1, the plate 10 is also sealed by the seals 15, 16 in the slot 18, where the plate 10 has continuous side portions 10.1 and 10.2, on opposite sides of the series of recesses 30, located between the front surface seal 15 and the rear surface seal 16.

Figures 4, 6, 7, 8:
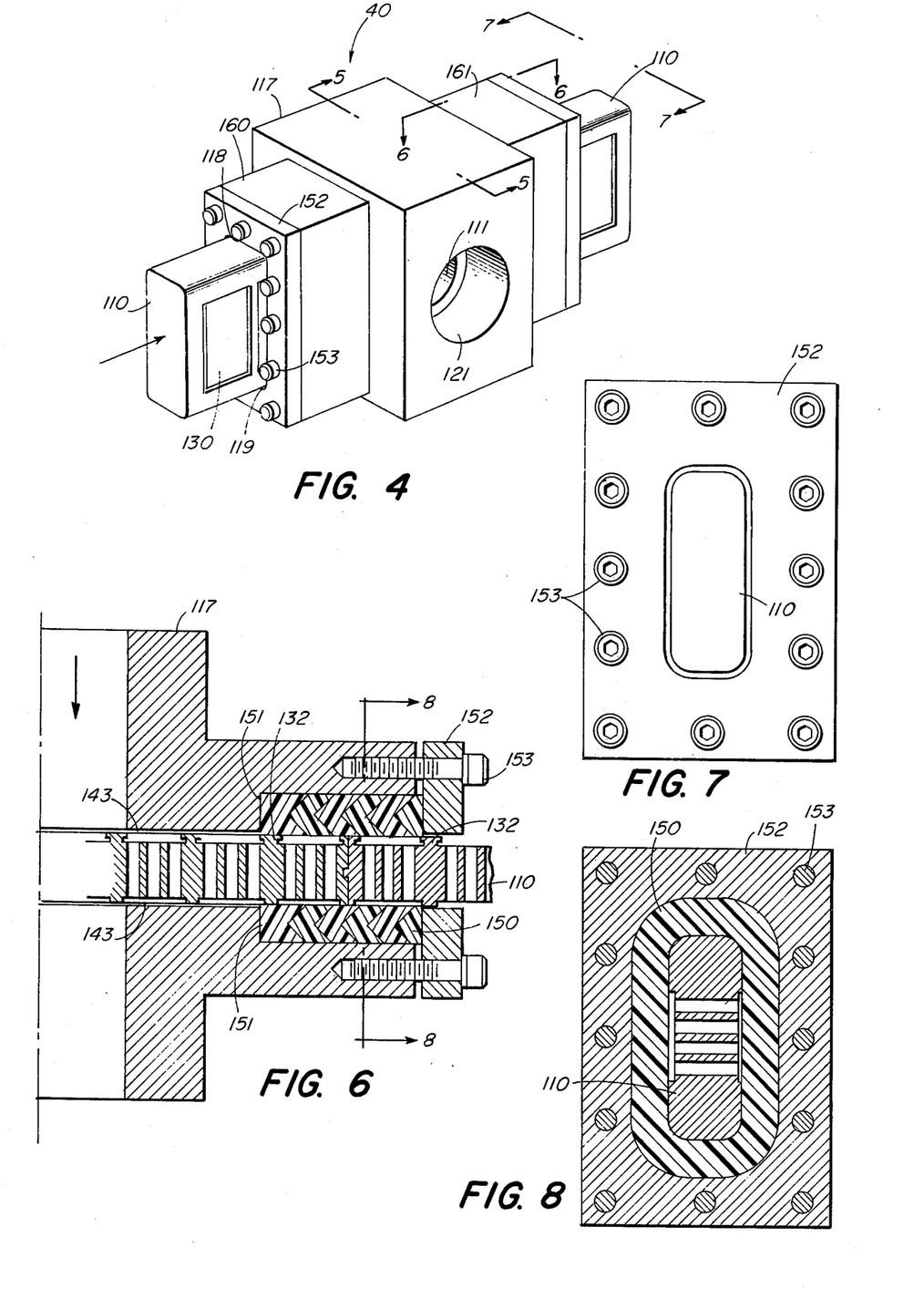
FIG. 4 is a perspective view of another embodiment of the slide filter apparatus.
FIG. 6 is a partial section view along line 6—6 in FIG. 4.
FIG. 7 is an end view in the direction of line 7—7 in FIG. 4.
FIG. 8 is a section view along line 8—8 in FIG. 6.

FIG. 4 is a perspective view of another slide filter device employing a slide plate 110, showing a recess 130, a fluid passage 111, cylindrical bore 121, guideway 118, and slide filter housing 117. In addition to the configuration of slide plate 110 in relation to guideway 118 as shown in FIG. 5, end seals as shown in FIGS. 6, 8, 9 and 10 are used at the inlet and outlet means 160, 161, respectively, for the slide plate 110.

Figure 5:
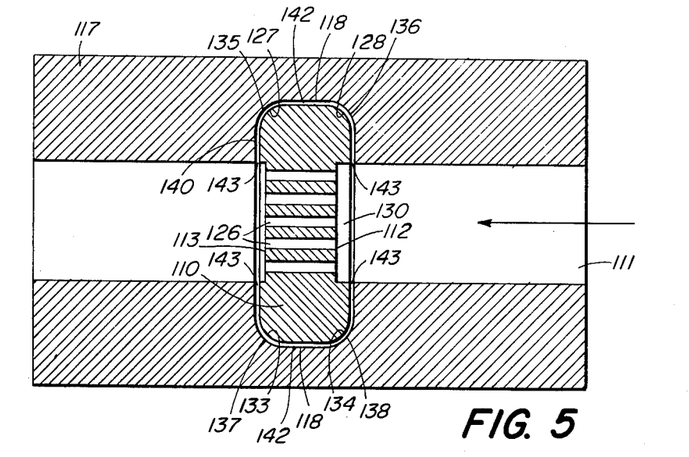
FIG. 5 is a section view along line 5—5 in FIG. 4.

Shown in FIG. 5 are the slide plate 110 with breaker plate passageways 126 confronting fluid passage 111 and the guideway 118 within the slide filter housing 117. Slide plate 110 moves along guideway 118 and is in close dimensional proximity to guideway 118. During operation the space between guideway and plate is so small that the close proximity forms an effective seal against material bypassing the filter by flowing around the slide plate to the downstream side. Typically, gaps 142, above and below slide plate 110, are approximately 0.001 inch. Gaps 143 between the front surface 112 and rear surface 113 of the slide plate and the guideway 118 are typically greater than 0.001 inch thick. In addition, the seal against bypass is enhanced by the fact that slide plate 110 is pressed against surface 140 due to the flow of material in fluid passage 111. The material filling gaps 142 is thus prevented from passing through gaps 143 along the rear surface 113 of slide plate 110, while at the same time permitting the slide plate 110 to be forced through the guideway 118 more easily than against a metal-to-metal friction contact.

The longitudinal corners 127, 128, 133 and 134 of slide plate 110 are rounded, as well as the corresponding longitudinal corners 135, 136, 137 and 138 of guideway 118, to provide a more effective end seal 150 in an inlet or outlet passage 160, 161 respectively, as shown for one of those passages in FIG. 6.

In this exemplary illustration, an end seal 150 abuts shoulder surface 151, and is pressed against that surface 151 when an end flange 152 is caused to move against end seal 150 by tightening the bolting means 153 bearing on the end seal from outside the passage. Thus, the end seal 150 is caused to press against the bars 132 at the front and rear surfaces of the slide plate as well as against the top and bottom of the slide plate 110. Although working material being filtered will fill the gap 143 it is blocked from leaking out of the device through an inlet or outlet passage by the end seal 150. The end seal 150 should be so much longer than the length of recess 130 that at least one bar 132 will be present at all times in each of the inlet and outlet passages for providing effective sealing against material leakage. The end seal 150 is typically made of a material similar to conventional packings. The use of an elastomeric seal at each end of the slide plate 110 allows for filtering materials that flow freely when only moderately heated or not heated at all; for example: a silicone.

In FIG. 7 the bolting means 153 is shown as a plurality of bolts 153 placed around the end flange 152 so as to place a substantially even amount of pressure on an end seal 150 (not shown in this figure).

In FIG. 8, the end flange 152, bolting means 153, end seal 150 and slide plate 110 are shown in section. As can be seen, an effective seal is maintained around the periphery of slide plate 110.

Figure 9:
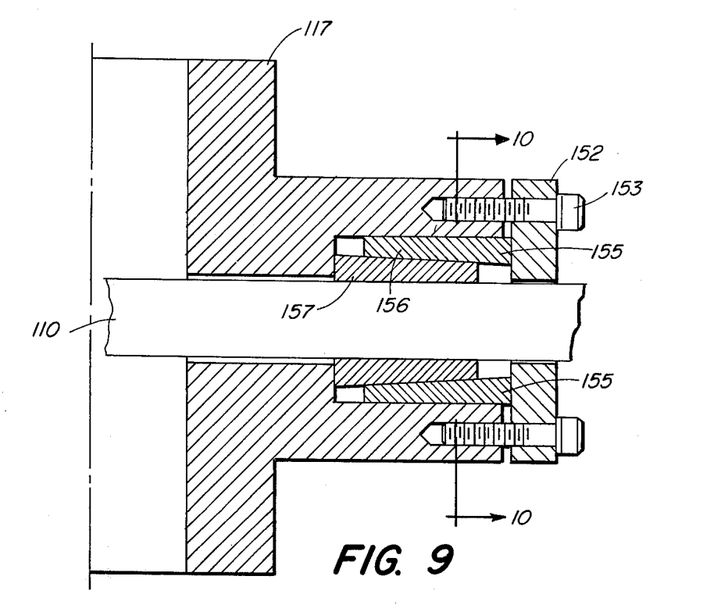
FIG. 9 is a partial section view in the same direction as line 6—6 in FIG. 4 showing another embodiment of my invention which modifies FIG. 4 in a detail.
Figure 10:
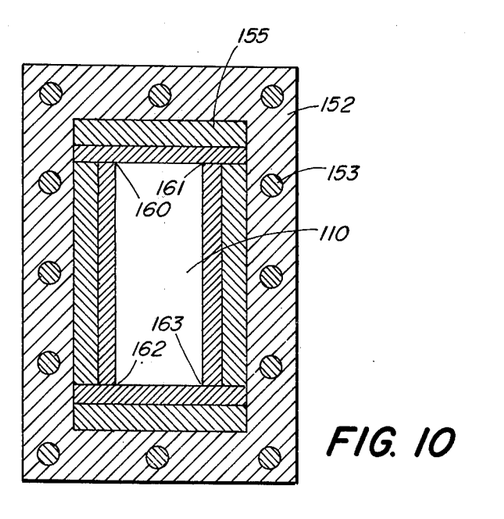
FIG. 10 is a section view along line 10—10 in FIG. 9.

Another embodiment of an end seal configuration is shown in FIGS. 9 and 10, where a wedge end seal 155 is made up of two wedges 156 and 157, for each side of slide plate 110 which are caused to be pressed or wedged together when the end flange 152 is pressed against the seal by bolting means 153. In one embodiment of end seal 155 one wedge 156 is made of steel while its mating wedge 157 is made of a low coeficient of friction material such as bronze, copper, iron or carbon.

FIG. 10 is a section view of wedge end seal 155 in relation to end flange 152 and slide plate 110. Also shown are the bolting means 153. Due to the shimming effect of wedge end seal 155 it is unnecessary for corners 160, 161, 162 and 163 of either slide plate or seals to be rounded. The approximate 90° corners provided by the intersection of seals are pressed against the slide plate 110 effectuating a tight seal between slide plate and end seal.

In the invention, the slide plate can be forced through the various sealing means illustrated by any typical mechanism, such as hydraulic ram. It will be appreciated also that other forms of applying sealing force may be used, and that no attempt has been made to illustrate all possible forms.

I claim:

1. A slide filtration apparatus for filtering a fluid material, comprising in combination:

A. a fluid flow path means having a fluid inlet and a fluid outlet,

B. guideway means which intersects said flow path means in a substantially perpendicular relationship, said guideway means having inlet and outlet portions on opposite sides of said flow path means, thereby defining an area of flow intersection between said inlet and outlet portions, C. a slide plate having at least a front surface and a back surface, said slide plate comprising at least one breaker means formed of bores extending through said front surface to said back surface; seal contact means surrounding said at least one breaker means on at least said front surface; said seal-contact means comprising substantially flat seal-contacting surfaces spatially displaced from and substantially parallel to said front surface; the total area of said seal-contacting surfaces representing a minor fraction relative to the area of said front surface, D. seal means positioned within said guideway means; said slide plate functioning to be insertable in and through said guideway means and said seal means; said guideway means being larger in cross-section than said slide plate, and E. seal adjustment means cooperatively functioning with said seal means to adjust said seal means within said guideway means so as to contact at least said front surface of said slide plate exclusively at said seal-contacting surfaces so as to enable said slide plate to be moved with reduced friction through said guideway for substantially continuous filter changing while maintaining substantially unchanged the adjustment of said seal adjustment means.

2. Filter apparatus according to claim 1 including a slide plate having a series of said breaker means surrounded by said seal-contact means, each of said breaker means being separated from an adjacent breaker means by a commonly-shared portion of its seal-contact means.

3. Filter apparatus according to claim 2 wherein the distance across each of said breaker means in the direction in which said slide plate is movable across said fluid flow path means is smaller than the transverse dimension of said path means in said direction, to facilitate incremental movement of said slide plate across said path means in steps that are smaller than said transverse dimension.

4. Filter apparatus according to claim 3 wherein said slide plate has a width dimension that is approximately the same as a transverse dimension of said fluid flow path means, and a length dimension that is at least approximately twice said width dimension, and said front and back surfaces are substantially parallel to each other and to said width and length dimensions, for locating selected ones of said breaker means in whole or in part across said fluid flow path means.

5. Filter apparatus according to claim 1 wherein said seal adjustment means includes a tubular member within said fluid flow path means and means to apply force parallel to said flow path means.

6. Filter apparatus according to claim 1 including screen means located over said bores in said breaker means, said seal contact means surrounding said breaker means having means peripherally to retain the screen means located over said bores.

7. Filter apparatus according to claim 1, wherein said slide plate, when inserted into said guideway means defines a gap means therebetween which is sufficiently narrow to minimize flow of said fluid through said gap means.

8. Filter apparatus according to claim 7, wherein said gap means is about 0.001 inches.

9. Filter apparatus according to claim 1 including sand-pack means located over said breaker means and substantially covering said bores therein, and retainer means cooperating with said seal-contact means for holding said sand-pack means.

10. A slide filtration apparatus for filtering a fluid material, comprising in combination:
   A. a fluid flow path means having a fluid inlet and a fluid outlet,
   B. guideway means which intersects said flow path means in a substantially perpendicular relationship, said guideway means having inlet and outlet portions on opposite sides of said flow path means, thereby defining an area of flow intersection between said inlet and outlet portions,
   C. a slide plate having at least a front surface and a back surface, said slide plate comprising at least one breaker means formed of bores extending through said front surface to said back surface; seal contact means surrounding said at least one breaker means on at least said front surface; said seal-contact means comprising substantially flat seal-contacting surfaces spatially displaced from and substantially parallel to said front surface; the total area of said seal-contacting surfaces representing a minor fraction relative to the area of said front surface,
   D. seal means positioned exclusively within at least one of said inlet portion and said outlet portion of said guideway means; said slide plate functioning to be insertable in and through said guideway means and said seal means; said guideway means being larger in cross-section than said slide plate, and
   E. seal adjustment means cooperatively functioning with said seal means to adjust said seal means within said at least one portion of said guideway means so as to contact at least said front surface of said slide plate exclusively at said seal-contacting surfaces exclusively within said at least one portion of said guideway means so as to enable said slide plate to be moved with reduced friction through said guideway for substantially continuous filter changing while maintaining substantially unchanged the adjustment of said seal adjustment means.

11. Filter apparatus according to claim 10 including first and second seal means located respectively within said inlet portion and outlet portion of said guideway means, and first and second force means operatively coupled respectively to each of said inlet and outlet portions to apply seal-adjustment force to each of said seal means.

12. Filter apparatus according to claim 10 wherein said at least one of said inlet and outlet portions is a substantially tubular body having inner walls confronting but spaced from said slide plate and said sealing means therein is operable under sealing force to expand in the space between said inner walls and said slide plate.

13. Filter apparatus according to claim 12 including means affixed to the outer end of said tubular body for applying sealing force in a direction into said respective inlet or outlet portion, and said sealing means is expansible in directions transverse to said force.

14. Filter apparatus according to claim 12 wherein said sealing means is made of an elastomeric material which surrounds said slide plate.

15. Filter apparatus according to claim 12 wherein said sealing means is made of cooperating wedge-shaped members which surround said slide plate.

16. Filter apparatus according to claim 10 wherein said seal means comprises expansible means, and said seal adjustment means comprises means to apply force to expand said expansible means between said slide plate and said guideway means.

17. Filter apparatus according to claim 10 having a first seal means positioned exclusively within said inlet portion of said guideway means and a second seal means positioned exclusively within said outlet portion of said guideway means; and a separate one of said seal adjustment means cooperatively functioning with each of said seal means, whereby to adjust each of said seal means independent of the other.

18. Filter apparatus according to claim 10 having a first seal means which is expandible and positioned exclusively within said inlet portion of said guideway means and a second seal means which is expandable and positioned exclusively within said outlet portion of said guideway means; and a separate one of said seal adjustment means cooperatively functioning to apply force separately to each of said seal means to cause it to expand independent of the other between said slide plate and said inlet portion or said outlet portion, respectively, of said guideway means.

* * * * *

UNITED STATES PATENT OFFICE
CERTIFICATE OF CORRECTION

Patent No. 4,059,525　　　　　　　Dated November 22, 1977

Inventor(s) Leonard L. Krasnow

It is certified that error appears in the above-identified patent and that said Letters Patent are hereby corrected as shown below:

Column 1, line 35, change "42,814" to --642,814--

Signed and Sealed this

Twenty-second Day of August 1978

[SEAL]

Attest:

RUTH C. MASON
Attesting Officer

DONALD W. BANNER
Commissioner of Patents and Trademarks